(12) United States Patent
Bemat et al.

(10) Patent No.: US 11,340,680 B2
(45) Date of Patent: May 24, 2022

(54) SYSTEM CONTROLLER FOR MONITORING A CHARACTERISTIC SYSTEM ENERGY OF A COMPUTING SYSTEM

(71) Applicant: HEWLETT PACKARD ENTERPRISE DEVELOPMENT LP, Houston, TX (US)

(72) Inventors: Mohamed Amin Bemat, Houston, TX (US); Daniel Humphrey, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 155 days.

(21) Appl. No.: 16/919,349

(22) Filed: Jul. 2, 2020

(65) Prior Publication Data

US 2022/0004240 A1    Jan. 6, 2022

(51) Int. Cl.
*G06F 1/30*    (2006.01)
(52) U.S. Cl.
CPC .................... *G06F 1/305* (2013.01)
(58) Field of Classification Search
CPC ...... G06F 1/3206; G05F 1/10; H02M 1/0003; H02M 3/1582
See application file for complete search history.

(56) References Cited

U.S. PATENT DOCUMENTS

| 7,852,053 | B2 | 12/2010 | Martin et al. |
| 9,594,387 | B2 | 3/2017 | Gakhar et al. |
| 10,203,710 | B2 | 2/2019 | Bhattad et al. |
| 10,425,007 | B2 | 9/2019 | Tang et al. |
| 2009/0189581 | A1* | 7/2009 | Lawson ............... H02M 3/1582 323/282 |
| 2010/0039089 | A1* | 2/2010 | Luzzi .................. G06K 19/0715 323/299 |
| 2011/0316500 | A1* | 12/2011 | Tang ................... H02M 3/1588 323/268 |
| 2014/0097819 | A1* | 4/2014 | Matsui .................. H02M 3/157 323/283 |
| 2020/0044553 | A1 | 2/2020 | Guo et al. |

OTHER PUBLICATIONS

Zhang S. et al., "Selection Considerations for Output Capacitors of Multiphase Voltage Regulators Part 1," SLUAA12, Mar. 2020.

\* cited by examiner

*Primary Examiner* — Mark A Connolly
(74) *Attorney, Agent, or Firm* — Hewlett Packard Enterprise Patent Department

(57) ABSTRACT

Examples described herein relate to a system controller for tracking a characteristic system energy of a computing system. The system controller may retrieve the characteristic system energy of the computing system from a voltage regulator (VR). The VR may include a VR controller, one or more phase converters, and an output capacitor coupled to a load to provide an operating voltage to the load. The characteristic system energy is related to a sum of capacitances comprising a capacitance of the output capacitor and a capacitance of the load and is determined by the VR controller based on a voltage at the output capacitor and a charging current or a discharging current of the output capacitor via the one or more phase converters. Further, the system controller may determine whether to initiate a corrective action for the VR based on a comparison between the characteristic system energy and a threshold value.

20 Claims, 7 Drawing Sheets

SYSTEM CONTROLLER FOR MONITORING A CHARACTERISTIC SYSTEM ENERGY OF A COMPUTING SYSTEM

BACKGROUND

In computing systems, for example, servers, desktop computers, and/or portable computing devices, processing resources (e.g., processors, microprocessors, etc.) are implemented to fulfill various computing demands. The computing demand from the computing systems may vary time-to-time and may be unpredictable in certain instances. Variations in the computing demand may cause changes in a processing load on the processing resources disposed in the computing systems.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
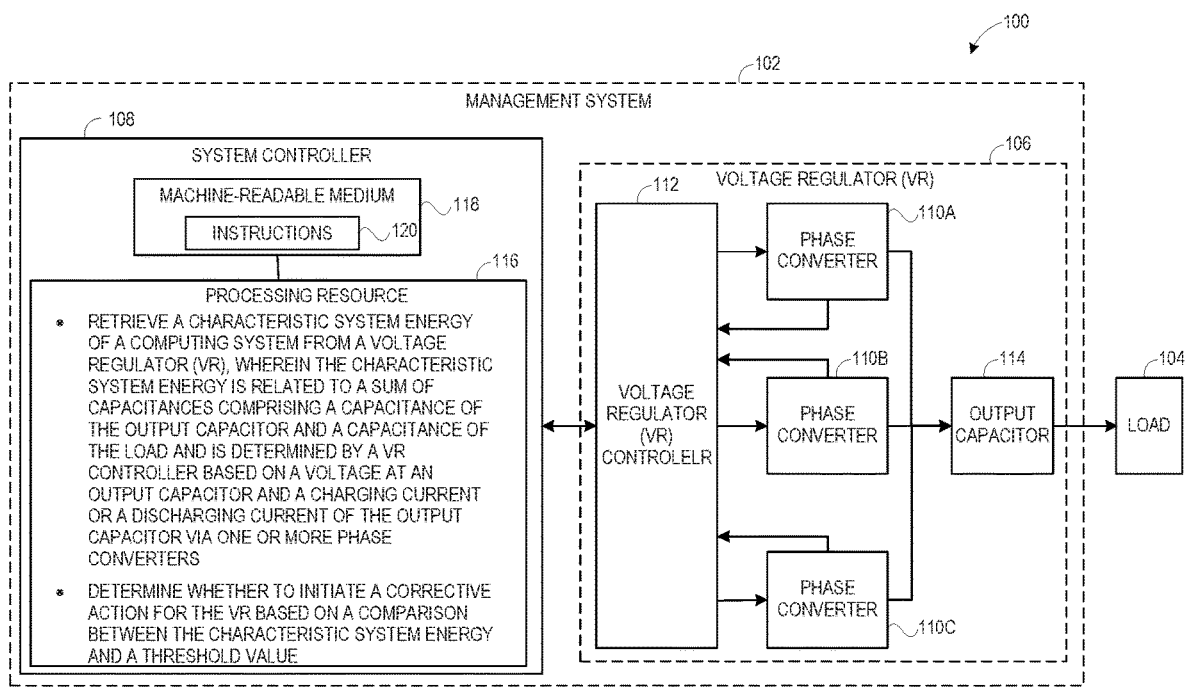
FIG. 1 depicts a computing system including a management system for tracking a characteristic system energy of a computing system, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements may be coupled mechanically, electrically, or magnetically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

In computing systems, such as, servers, desktop computers, and/or portable computing devices, processing resources are implemented to fulfill various computing demands. The computing demand from these computing systems may vary from time-to-time and may be unpredictable in certain instances. The variations in the computing demand may cause changes in a processing load on the processing resources disposed in the computing systems. For example, a sudden increase in the computing demand may cause an increase, e.g., a surge, in the processing load of the processing resources to address the increased computing demand. Consequently, the processing resources may draw more current to operate at high-performance levels to handle the increased processing load. With use of high-performance processing resources (e.g., processors), peak current demanded by processing resources in the computing system continue to increase from generation to generation.

Typically, in a computing system, processing resources receive regulated power supply. The regulated power may be supplied to the processing resources from a voltage regulator disposed in the computing system. The voltage regulator may typically include power converters having electronic switches, a controller to manage switching of the electronic switches in the power converters, inductors as magnetic storage elements and an output capacitor. The voltage regulator may be coupled to the processing resources via the output capacitor. In an event of the surge in the current drawn by the processing resources, the controller in the voltage regulator may control switching of the electronic switches in the power converters to supply increased current to the processing resources. While the power converters and the controller may take some time to adapt to the change (e.g., sudden increase) in the current demand from the processing resources, the output capacitor may cater to this current demand by quickly discharging an energy stored in the output capacitor. As will be understood, any degradation, lot-to-lot variations, and/or manufacturer-to-manufacturer variations in the capacitance of the output capacitor may lead to situations where the processing resources may be exposed to voltage levels that do not meet minimum processor requirements. This could lead to any number of undesirable consequences (e.g., malfunctioning, untimely shut-down, operating system crash) in the computing system.

In accordance with aspects of the present application, a system controller (e.g., manageability controller/baseboard management controller) in the computing system may track the characteristic system energy of the computing system. For example, the system controller may retrieve the characteristic system energy of the computing system from a voltage regulator (VR) comprising a VR controller, one or more phase converters, and an output capacitor coupled to a load to provide an operating voltage to the load. The characteristic system energy is related to a sum of capacitances comprising a capacitance of the output capacitor and a capacitance of the load and is determined by the VR controller based on a voltage at the output capacitor and a charging current or the discharging current of the output capacitor via the one or more phase converters. In some examples, the VR controller may determine and record the characteristic system energy at a power-on or power-down (e.g., power-off) of the computing system. The term power-down is also interchangeably referred to as power-off. The characteristic system energy recorded by the VR controller may be retrieved by the system controller at every power-on or power-down of the computing system.

Further, the system controller may determine whether to initiate a corrective action (e.g., generating an alert, a service/maintenance request, changing an operating mode of the VR) for the VR based on a comparison between the characteristic system energy and a threshold value. For example, the system controller may determine whether the characteristic system energy is lower than the threshold value, and initiate the corrective action for the VR in response to determining that the characteristic system energy is lower than the threshold value. The characteristic system energy being lower than the threshold value may indicate that the capacitance of the output capacitor of the VR is degraded. An increase in characteristics system energy may indicate processing load current increase during system power-on or power-down characterization.

As will be appreciated, the system controller, in accordance with various aspects of the present disclosure, may track the characteristic system energy that is indicative of a health the output capacitor and/or the load. Accordingly, in some examples, the system controller may aid a manufacturer of the computing system to determine the characteristic system energy and compare it with a corresponding threshold value during production stage of the computing system. The manufacturer may choose to accept the computing system for shipping to a customer based on the comparison of the characteristic system energy with the corresponding threshold value. In addition, the manufacturer may record such measurement of the characteristic system energy of the computing system during production. Moreover, the system controller may aid in tracking the characteristic system energy during an operation of the computing system, as well. The characteristic system energy tracked during the operation of the computing system may aid in taking appropriate corrective action, which may include operating the VR in a different mode, generating a service request, generating an alert, and the like. Additionally, the system controller may also analyze a log of the characteristic system energy measurements tracked over a period to determine a trend of the characteristic system energy for the period. Accordingly, the system controller may determine whether any of the output capacitor of the VR or the load is facing any performance issue for which the corrective action may be initiated. Such tracking of the characteristic system energy may aid in facilitating a reliable operation of the computing system and providing appropriate service and maintenance of the computing system in a timely manner.

Referring now to the drawings, in FIG. 1, a computing system 100 including a management system 102 for tracking a characteristic system energy of the computing system 100 is presented, in accordance with an example. The computing system 100 may be capable of storing data, processing data, and/or communicating data with external devices over a network. Non-limiting examples of the computing system 100 may include, but are not limited to, a server, a storage device, a network switch, a router, a mobile communication device, a desktop computer, a portable computer, a networked resource enclosure, an edge-computing device, or a WLAN access point. The server may be a blade server, for example. The storage device may be a storage blade, for example.

As depicted in FIG. 1, the computing system 100 may include the management system 102 coupled to a load 104. As will be appreciated, the computing system 100 may also include several other electronic components that are not shown in FIG. 1. The management system 102 may provide a regulated power to the load 104 to enable functioning of the load 104. The load 104 may be any electronic component that consumes the regulated power generated by the management system 102. Examples of the load 104 may include storage devices, auxiliary sub-systems, and compute resources such as one or more processors, and the like. In the description hereinafter, the load 104 is described as being a processing resource for illustration purposes. By way of example, the processing resource (i.e., an example load 104) may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of computing, data processing, and/or graphics processing requirements in the computing system 100.

The management system 102 may include a voltage regulator (VR) 106 and a system controller 108 operatively coupled to the VR 106. The management system 102 may supply a regulated power to the load 104. In some examples, the VR 106 may regulate voltage generated by a power supply (not shown). In some examples, the VR 106 may be connected to the power supply via an input power line. The power supply may receive utility power and convert the utility power to a DC power that may be available on the input power line. Accordingly, the input power line may be generally be maintained at a stable predefined voltage (e.g., 12V DC). In some examples, the VR 106 may further convert the voltage on the input power line to a different voltage level lower than the predefined voltage. For example, if the load 104 operates at a voltage lower than the predefined voltage on the input power line, the VR 106 may generate power at a reduced voltage level suitable for the load 104 to operate and keep the reduced voltage in regulation.

In order to achieve such voltage regulation, the VR 106 may include one or more phase converters 110A, 110B, and 110C (hereinafter collectively referred to as phase converters 110A-110C). Although the VR 106 is shown to include three phase converters, use of a VR having less than three or more than three phase converters is also envisioned within the purview of the present disclosure. In some examples, each of the phase converters 110A-110C may be a buck converter. In some other examples, the each of the phase converters 110A-110O may include a boost converter or a buck-boost converter. In certain other examples, the phase converters 110A-110O may include any combination of the buck converter, the boost converter, or the buck-boost converter. The phase converters 110A-110C may include a plurality of electronic switches (e.g., semiconductor switches, not shown), switching of which may be controlled by a VR controller 112 to cause the phase converters 110A-110C to convert the power received from the power supply into a power suitable for use by the load 104. In some examples, the phase converters 110A-110C may supply a power to the load 104 at a reduced voltage in comparison to the predetermined voltage on the input power line.

The VR controller 112 may include electronics to enable switching of the electronic switches in the phase converters 110A-110O, thereby causing the phase converters 110A-110O operate. In some examples, the VR controller 112 may include a processing resource and storage medium (see FIGS. 7 and 8). The storage medium may be configured with instructions, which when executed by the processing resource cause the processing resource to generate control signals for one or more of the phase converters 110A, 110B, and 110C. The control signals may cause enabling or disabling of the phase converters 110A, 110B, and 110C and may control switching of the respective electronic switches in the phase converters 110A, 110B, and 110C. Further, the processing resource that may be used in the VR controller 112 may be a physical device, for example, one or more central processing unit (CPU), one or more semiconductor-based microprocessors, application-specific integrated circuit (ASIC), a field programmable gate array (FPGA), other hardware devices, or combinations thereof, capable of retrieving and executing of the instructions stored in the storage medium. As an alternative or in addition to executing the instructions, the processing resource may include at least one integrated circuit (IC), control logic, electronic circuits, or combinations thereof that include a number of electronic components for performing the functionalities intended to be performed by the VR controller 112.

As will be understood, variations in a computing demand on the computing system 100 may cause changes in a processing load on the load 104 (e.g., the processing resources) disposed in the computing system 100. For example, a sudden increase in the computing demand may cause and an increase, e.g., a surge, in the processing load of the processing resources to address the increased computing demand. Consequently, the load 104 may draw more current to operate at high-performance levels to handle the increased processing load. In order to address such increased current demand, in some examples, the VR 106 may include an output capacitor 114 (sometimes, also commonly referred to as "VR output capacitor") through which the load 104 may receive the regulated voltage. In an event of the surge in the current drawn by the processing resources due to increased processing loads thereon, the VR controller 112 may control switching of the electronic switches in the power converters to supply increased current to the load 104. While the phase converters 110A-110O and the VR controller 112 may take some time to adapt to the change (e.g., sudden increase) in the current demand from the load 104, the output capacitor 114 may cater to this increased current demand by quickly discharging an energy stored in the output capacitor 114. As will be understood, any degradation, lot-to-lot variations, and/or manufacturer-to-manufacturer variations in the capacitance of an output capacitor may lead to situations where a load may be exposed to voltage levels, which do not meet minimum processor requirements. This could lead to any number of undesirable consequences (e.g., malfunctioning, untimely shut-down, operating system crash) in a computing system.

As will be appreciated, in accordance with aspect of the present disclosure, the VR controller 112 in conjunction with the system controller 108 may aid in tracking a characteristic system energy of the computing system 100 and initiating a corrective action to minimize or avoid undesirable consequences of any degradation of the output capacitor 114 or any energy leakage in the load 104. The energy leakage in the load 104 may be caused due to increase in the parasitic capacitances in the load 104 or degradation of characteristic capacitance of the load 104 or any other loads connected to the load 104. In some examples, the term "characteristic system energy" as used herein may refer to an energy that is used to charge the output capacitor 114 from a first potential to a second potential higher than the first potential. Further, in some examples, the term "characteristic system energy" as used herein may refer to an energy that the output capacitor 114 releases while being discharged from a third potential to a fourth potential lower than the third potential. Since the output capacitor 114 is coupled with the load 104, any capacitance associated with the load 104 may also affect the charging and discharging of the output capacitor 114 and hence the characteristic system energy. Accordingly, the characteristic system energy may be related to a capacitance of the output capacitor 114 and the capacitance of the load 104. More particularly, in some examples, the characteristic system energy may be related to a sum of capacitances comprising the capacitance of the output capacitor 114 and a capacitance of the load 104. For instance, as the sum of the capacitances of the output capacitor 114 and the load 104 reduces, the characteristic system energy may reduce.

In some examples, the VR controller 112 may determine the characteristic system energy of the computing system 100 on a given power transition event of the computing system 100. The term "power transition event" as used herein may refer to any of a power-on event or a power-down event of the computing system 100. The power-on event may be an event when the computing system 100 is powering-on. The power-down event may be an event when the computing system 100 is powering-off. Accordingly, the VR controller 112 may determine the characteristic system energy during the power-on event, the power-down event, or both by measuring a voltage at the output capacitor 114 (hereinafter referred to as "output capacitor voltage") and current flowing via one or more of the phase converters 110A-110O. Additional details of determining the characteristic system energy is described in conjunction with FIGS. 5 and 6. Once the characteristic system energy is determined, the VR controller 112 may record the determined characteristic system energy (i.e., a value of the characteristic system energy).

Further, in some examples, in accordance with aspects of the present application, the system controller 108 may track the characteristic system energy of the computing system 100 at the power transition event and determine whether to initiate a corrective action for the computing system 100 based on the characteristic system energy. In some examples, the system controller 108 may be a manageability controller for the computing system 100 and is alternatively referred to as a baseboard management controller (BMC). In certain other examples, the system controller 108 may be a processor-based system separate from the manageability controller and configured to track the characteristic system energy of the computing system 100. In the description hereinafter, for illustration purposes, the system controller 108 is described as being implemented by the manageability controller, without limiting the scope of the present disclosure. Accordingly, in certain examples, the system controller 108 may be used to implement services for the computing device 100 and may be implemented using a separate processing resource (described below) from a main processing resource (e.g., the load 104) of the computing device that is used to execute an operating system (OS) for the computing system 100.

In some examples, the system controller 108 may provide so-called "lights-out" functionality for the computing system 100. For example, the lights-out functionality may allow a user, such as a system administrator, to perform management operations on the computing system 100 even if the OS is not installed or not functional on the computing system 100. Moreover, in one example, the system controller 108 may run on an auxiliary power, thus the computing system 100 need not be powered on to an ON-state where control of the computing system 100 is handed over to an operating system after boot. As such, the system controller 108 may provide remote management access (e.g., system console access) regardless of whether the computing system 100 is powered on, whether a primary subsystem hardware of the computing system 100 is functioning, or whether an OS is operating or even installed. In some examples, the system controller 108 may also have management capabilities for sub-systems (e.g., cooling system) of a computing system 100. Moreover, in certain examples, the system controller 108 may provide so-called "out-of-band" (OOB) services, such as remote console access, remote reboot and power management functionality, monitoring health of the system (e.g., tracking the characteristic system energy), access to system logs, and the like, for the computing system 100. In some examples, execution of the OOB services by the system controller 108 does not interfere with instructions or workloads running on the main processing resource (e.g., the load 104) of the computing system 100.

In some examples, the system controller 108 may include a processing resource 116 and a machine-readable medium 118. The machine-readable medium 118 may be any electronic, magnetic, optical, or other physical storage device that may store data and/or executable instructions 120. For example, the machine-readable medium 118 may be a Random Access Memory (RAM), an Electrically Erasable Programmable Read-Only Memory (EEPROM), a storage drive, a flash memory, a Compact Disc Read Only Memory (CD-ROM), and the like. The machine-readable medium 118 may be non-transitory. As described in detail herein, the machine-readable medium 118 may be encoded with the executable instructions 120 to perform one or more methods, for example, methods described in FIGS. 2 and 3. In certain examples, the machine-readable medium 118 may also be encoded with the executable instructions 120 to perform one or more methods, for example, methods described in FIGS. 4 and 5.

Further, the processing resource 116 may be a physical device, for example, one or more central processing unit (CPU), one or more semiconductor-based microprocessors, an application-specific integrated circuit (ASIC), a field programmable gate array (FPGA), other hardware devices capable of retrieving and executing instructions 120 stored in the machine-readable medium 118, or combinations thereof. The processing resource 116 may fetch, decode, and execute the instructions 120 stored in the machine-readable medium 118 to track the characteristic system energy and take corrective actions for the computing system 100 based on the characteristic system energy. As an alternative or in addition to executing the instructions 120, the processing resource 116 may include at least one integrated circuit (IC), control logic, electronic circuits, or combinations thereof that include a number of electronic components for performing the functionalities intended to be performed by the system controller 108 (described further below).

In accordance with aspects of the present disclosure, the processing resource 116 in the system controller 108 may execute one or more of the instructions 120 to retrieve the characteristic system energy of the computing system 100 from the VR 106 (e.g., from the VR controller 112 of the VR 106). Details of determining the characteristic system energy are described in conjunction with FIGS. 4, 5, 6, and 7. Further, the processing resource 116 may execute one or more of the instructions 120 to determine whether to initiate a corrective action (e.g., generating an alert, a service/maintenance request, changing an operating mode of the VR) for the VR 106 based on a comparison between the characteristic system energy and a threshold value. For example, the system controller 108 may determine whether the characteristic system energy is lower than the threshold value, and initiate the corrective action for the VR 106 in response to determining that the characteristic system energy is lower than the threshold value. Additional details of the operations of the system controller 108 will be described in conjunction with FIGS. 2 and 3.

As will be appreciated, the system controller 108, in accordance with various aspects of the present disclosure, may track the characteristic system energy that is indicative of a health the output capacitor 114 and/or the load 104. Accordingly, in some examples, the system controller may aid a manufacturer of the computing system 100 to determine the characteristic system energy during production and compare it with a corresponding threshold value during production stage of the computing system. The manufacturer may choose to accept the computing system 100 for shipping to a customer based on the comparison of the characteristic system energy with the corresponding threshold value. In addition, the manufacturer may record such measurement of the characteristic system energy of the computing system during production.

Moreover, the system controller 108 may aid in tracking the characteristic system energy during an operation of the computing system, as well. The characteristic system energy tracked during the operation of the computing system may aid in taking appropriate corrective action, which may include operating the VR 106 in a different mode, generating the service request, generating the alert, and the like. Additionally, the system controller 108 may also analyze a log of the characteristic system energy measurements tracked over a period to determine a trend of the characteristic system energy for the period. Accordingly, the system controller may determine whether any of the output capacitor 114 of the VR 106 or the load 104 is facing any performance issue for which the corrective action may be initiated. Such tracking of the characteristic system energy may aid in facilitating a reliable operation of the computing system 100 and providing appropriate service and maintenance of the computing system 100 in a timely manner.

Further, measurement of the characteristic system energy as performed by the VR controller 112 may not affect normal power-on or power-down sequence of the computing system 100. Additionally, use of the VR controller 112 to monitor the characteristic system energy obviates need of other test devices and/or electronics to measure the characteristic system energy, thereby reducing cost and complexity of such measurements.

Figure 2:
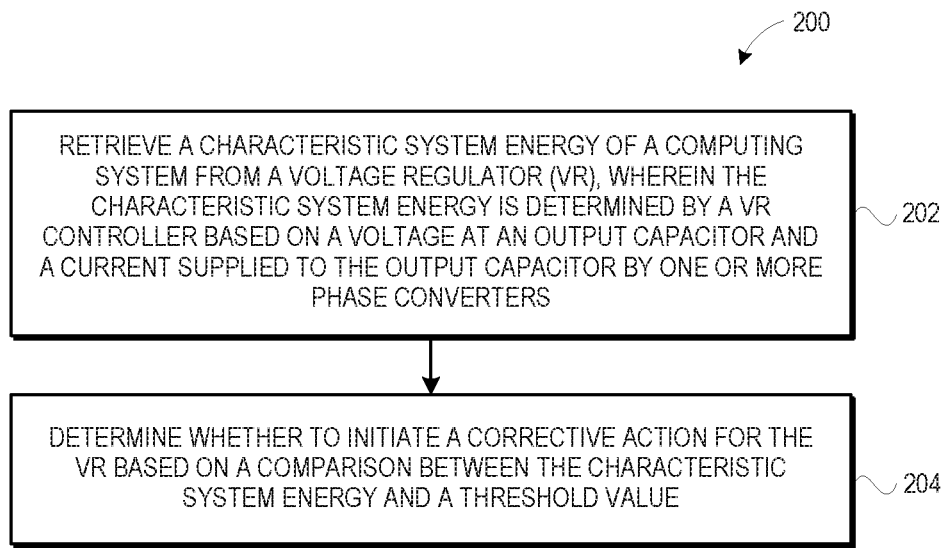
FIG. 2 is a flow diagram depicting a method for determining whether to take corrective action for a computing system based on a characteristic system energy, in accordance with an example.

Referring now to FIG. 2, a flow diagram depicting a method 200 for determining whether to take corrective action for a computing system based on the characteristic system energy is presented, in accordance with an example. In some examples, the method 200 may be performed by the system controller 108 during each power transition event of the computing system 100. For example, the method 200 may be performed each time when the computing system 100 is powered-on, powered-off, or both. For illustration purposes, the method 200 will be described in conjunction with the computing system 100 of FIG. 1. The method 200 may include method blocks 202 and 204 that may be performed by a processor-based system, for example, the system controller 108. In particular, operations at the method blocks 202 and 204 may be performed by the processing resource 116 by executing instructions 120 stored in a machine-readable medium 118.

At block 202, the system controller 108 may retrieve the characteristic system energy of the computing system 100 from the VR 106. As previously noted, the characteristic system energy is related to a sum of capacitances comprising the capacitance of the output capacitor 114 and the capacitance of the load 104. The characteristic system energy may be determined by the VR controller 112 based on a voltage at the output capacitor 114 and a charging current or a discharging current of the output capacitor 114 via the one or more phase converters. Details of determining the characteristic system energy by the VR controller 112 are described in conjunction with FIGS. 4, 5, 6, and 7.

Further, at block 204, the system controller 108 may determine whether to initiate a corrective action for the VR 106 based on a comparison between the characteristic system energy and a threshold value. For instance, the characteristic system energy being lower than the threshold value may be indicative of a condition when the capacitance of the output capacitor 114 has degraded. Such degradation of the capacitance of the output capacitor 114, if not addressed, may cause various performance and/or reliability issues. To that end, the system controller 108 may determine that the corrective action to address the degradation of the capacitance of the output capacitor 114 needs to be taken based on the comparison between the characteristic system energy and the threshold value. More details on the corrective action taken by the system controller 108 are described in conjunction with FIG. 3.

Figure 3:
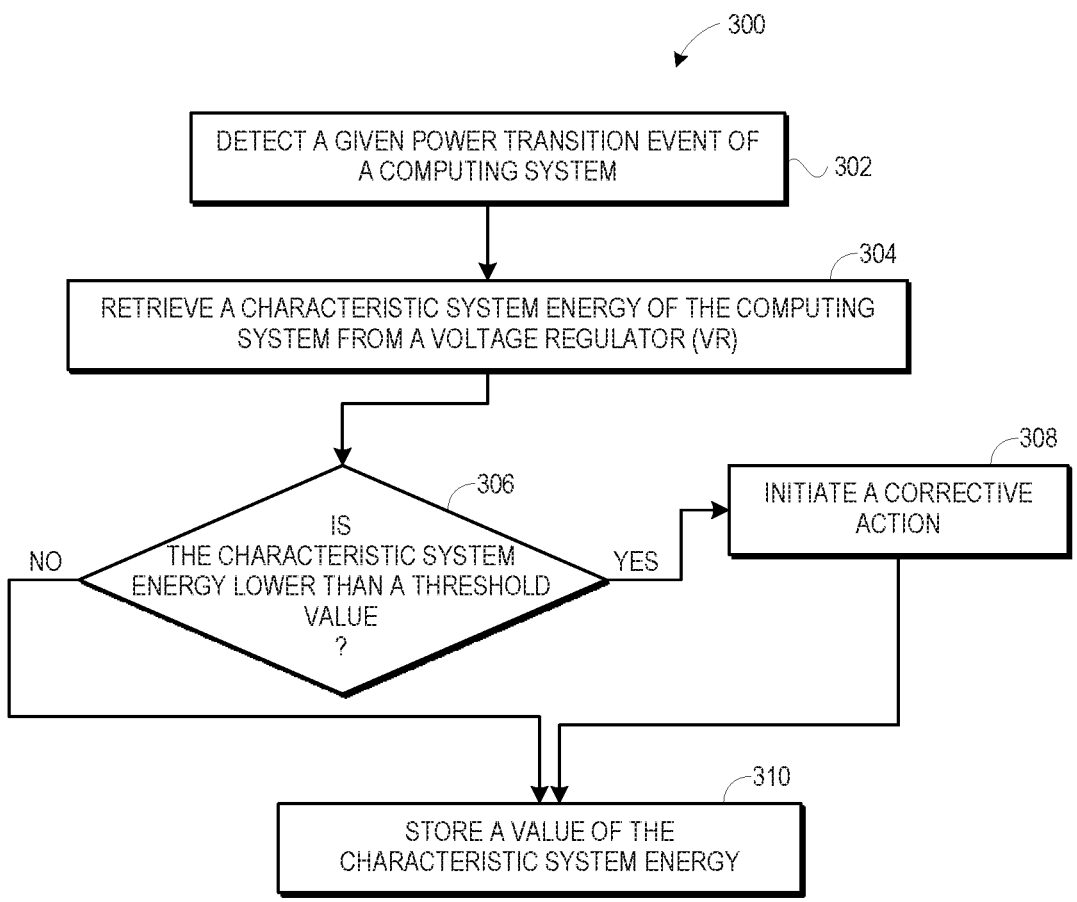
FIG. 3 is a flow diagram depicting a method for taking corrective action for a computing system based on a characteristic system energy, in accordance with an example.

Referring now to FIG. 3, a flow diagram depicting a method 300 for taking corrective action for the computing system 100 based on the characteristic system energy is presented, in accordance with an example. The method 300 may provide certain additional details to the method 200 of FIG. 2. The method 300 may include method blocks 302, 304, 306, 308, and 310 that may be performed by a processor-based system, for example, the system controller 108. In particular, operations at the method blocks 202 and 204 may be performed by the processing resource 116 by executing instructions 120 stored in a machine-readable medium 118.

At block 302, the system controller 108 may detect a given power transition event of the computing system 100. For example, at block 302, the system controller 108 may detect that the computing system 100 is powered-on and consider such power transition event as a power-on event. In another example, the system controller 108 may detect that the computing system 100 is powered-down (i.e., powered-off) and consider such power transition event as a power-down event. Further, at such power transition event, the VR controller 112 would have also determined and recorded the characteristic system energy of the computing system 100 (see FIGS. 4 and 5). Accordingly, at block 304, the system controller 108 may retrieve the characteristic system energy of the computing system 100 from the VR 106. As previously noted, the characteristic system energy is related to a sum of capacitances comprising the capacitance of the output capacitor 114 and the capacitance of the load 104.

Further, at block 306, the system controller 108 may determine whether the characteristic system energy is lower than a threshold value. In some example, the system controller 108 may maintain a mapping of an identity information of the load 104 and corresponding predetermined threshold values. For example, the identity information of the load 104 (e.g., a processor) may include a model number, a product family and/or batch information of the load 104, or both. Generally, devices having similar model number or belonging to a common product family and/or batch may have some similar electric characteristics, for example, an operating voltage, over all capacitance, and the like. Accordingly, in some examples, the system controller 108 may select the threshold value based on an identity of the load 104. The system controller 108 may then compare the characteristic system energy obtained from the VR controller 112 with the selected threshold value.

At block 306, if it is determined that the characteristic system energy is lower than the threshold value, the system controller 108, at block 308, may initiate a corrective action. For instance, the characteristic system energy being lower than the threshold value may indicate the output capacitor 114 is degraded (i.e., the capacitance of the capacitor 114 has reduced over a period). In one example, the corrective action may include generating an alert, a service request, or both. In one example, the alert may be displayed on a display (e.g., a monitor) associated with the computing device 100. In some other examples, the alert may be communicated to a user/administrator of the computing device 100 over a network (e.g., internet, cellular, Wi-Fi, etc.). Further, the service request may be reported to a manufacturer and/or an entity responsible facilitating maintenance and/or services for the computing device 100 (hereinafter referred to as a service entity). Further, in certain other examples, the system controller 108 may instruct the VR controller 112 to operate the VR 106 in a predetermined mode. The predetermined mode may be a predefined safe mode in which the VR controller 112 may change its operating controls for the phase converters 110A-1100 to more aggressively tradeoff performance characteristics, such as efficiency to regulate the output capacitor voltage.

Furthermore, at block 310, the system controller 108 may store a value of the characteristic system energy. The value of the characteristic system energy may be stored in the machine-readable medium 118 for any later reference or analysis by the system controller 108. For example, the system controller 108 may create a log of the characteristic system energy retrieved from the VR controller 112 over a period for each power transition event. The log of the characteristic system energy may be stored in the machine-readable medium 118 as a log file for any later reference or analysis by the system controller 108. In one example, the system controller 108 and/or the service entity may perform a trend analysis of the characteristic system energy tracked over the period. For example, the system controller 108 may determine a trend of the characteristic system energy variation based on the log.

The trend of the characteristic system energy over the period may indicate any of an increase in the characteristic system energy over the period, a decrease in the characteristic system energy over the period, or a steady characteristic system energy. In some examples, the system controller 108 may determine that the output capacitor 114 of the VR 106 has degraded if the trend shows a decline in the value of the characteristic system energy over the period. In particular, if the trend shows the decline, it may be determined that the output capacitor 114 requires less energy (that is increasing over the period) to reach to a certain voltage (e.g., a power-on measurement end threshold voltage, described later) or releases less energy (that may also be increasing over the period) to discharge up-to a particular voltage (e.g., a power-down measurement end threshold voltage, described later). The output capacitor 114 requiring less energy to charge or releasing less energy while discharging may indicate that the output capacitor 114 has degraded. In some examples, the system controller 108 may determine that there exists an issue with the load 104 if the trend shows an incline in a value of the characteristic system energy over a period. Typically, the output capacitor 114 may degrade over a period. However, the incline in the trend may indicate that the load 104 is taking more energy than required and this might be caused due to degradation of inherent capacitances or increase in current and/or energy leakages of the load 104. Hence, it may be determined that there may be some issue with the load 104, which may be investigated.

Figure 4:
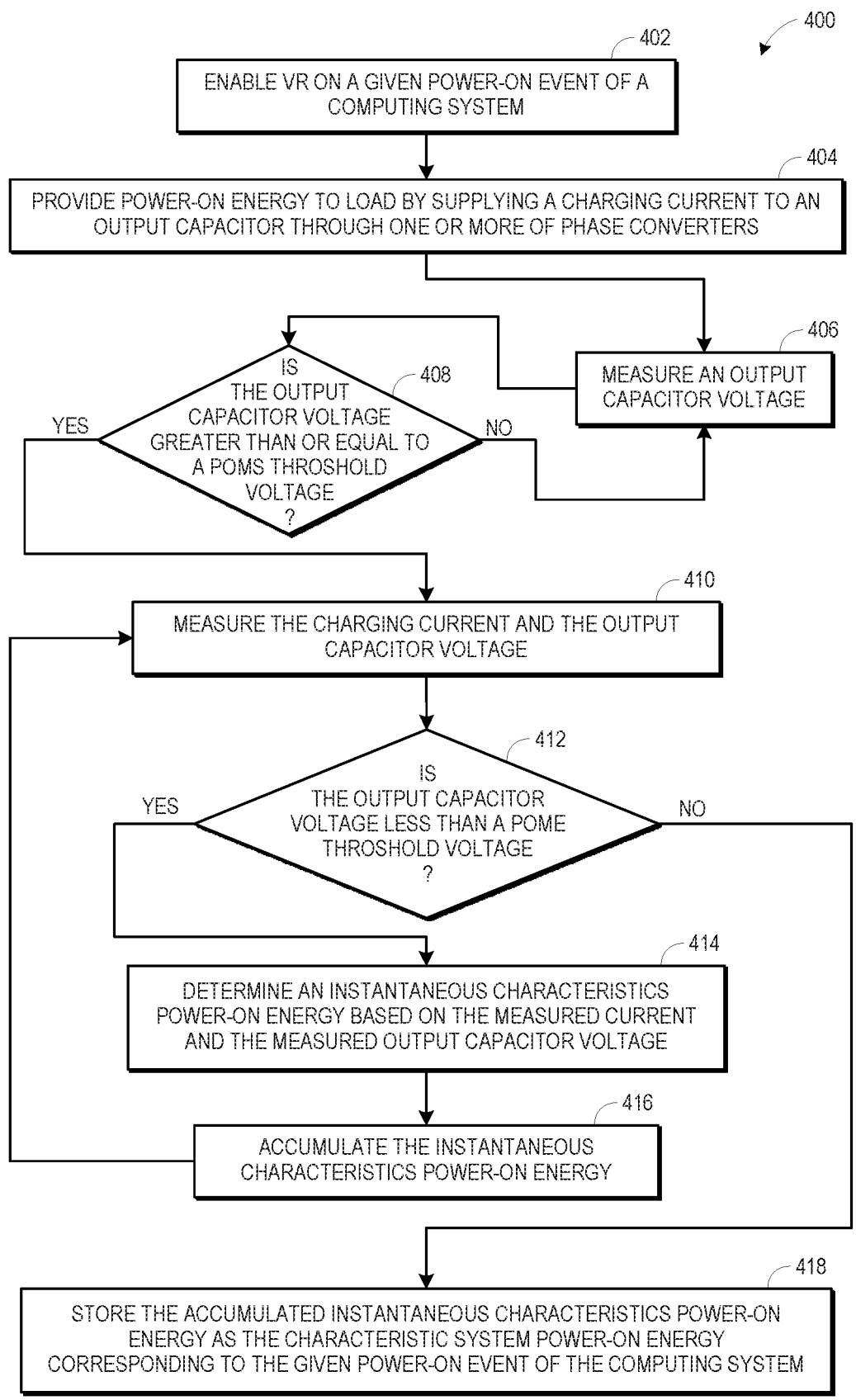
FIG. 4 is a flow diagram depicting a method for monitoring a characteristic system energy, in accordance with an example.

FIG. 4 is a flow diagram depicting a method 400 for monitoring a characteristic system energy, in accordance with an example. The method 400 may represent one example method of monitoring a characteristic system energy during a given power-on event of the computing system 100. In some examples, the method 400 may be performed by the VR controller 112 during each time the computing system 100 is turned-on. For illustration purposes, the method 400 will be described in conjunction with the computing system 100 of FIG. 1. The method 400 may include method blocks 402, 404, 406, 408, 410, 412, 414, 416, and 418 (hereinafter collectively referred to as blocks 402-418) some of which may be performed by a processor-based system, for example, the VR controller 112. In particular, operations at each of the method blocks 404-418 may be performed by a processing resource (not shown in FIGS. 1 and 4, see FIG. 7) by executing instructions 306 stored in a machine-readable medium (see FIG. 7). In the example of FIG. 4, the VR controller 112 may measure the characteristic system energy as a characteristic system power-on energy for the given power-on event.

At block 402, the system controller 108 may enable the VR 106 at a given power-on event of the computing system (e.g., when the computing system 100 is turned-on). The system controller 108 may enable the VR 106 by sending a VR turn-on signal to the VR controller 112 of the VR 106. Further, at block 404, the VR 106 may initiate providing power-on energy to the load 104 by supplying a charging current to the output capacitor 114 through one or more of phase converters 110A-110O. In some examples, the VR controller 112 may enable one of the phase converters 110A-110O (e.g., the phase converter 110A) to supply the charging current to the output capacitor 114. In certain other examples, the VR controller 112 may enable a plurality of the phase converters 110A-110O (e.g., the phase converter 110A) or all of the phase converters 110A-110C to supply the charging current to the output capacitor 114. As will be appreciated, when the charging current is supplied to the output capacitor 114 by only one phase converter (e.g., the phase converter 110A), a better signal-to-noise ratio may be achieved in measurement of the charging current at blocks 406 and 410 (described later) in comparison to a measurement of charging current supplied by a plurality of the phase converters 110A-110O.

Further, in certain examples, the VR controller 112 may switch among phase converters of the one or more phase converters 110A-110C to charge the output capacitor 114. In other words, the VR controller 112 may alternatingly enable one of the phase converters 110A-110C to supply the charging current to the output capacitor 114 for subsequent power-on events. For instance, in a given power-on event, if the phase converter 110A is enabled to charge the output capacitor 114, in a next power-on event another phase converter 110B may be enabled to charge the output capacitor 114. Moreover, in a further next power-on event another phase converter 110C may be enabled to charge the output capacitor 114. Such switching among phase converters to charge the output capacitor 114 may enhance a lifetime of the phase converters 110A-110O.

Furthermore, at block 406, the VR controller 112 may measure a voltage across the output capacitor 114 (e.g., the output capacitor voltage). The VR controller 112 may measure the output capacitor voltage using one or more voltage sensors (not shown). At block 408, the VR controller 112 may compare the output capacitor voltage measured at block 406 with a power-on measurement start (POMS) threshold voltage to determine whether the output capacitor voltage is greater than the POMS threshold voltage. The POMS threshold voltage may be a predetermined voltage which when achieved by the output capacitor 114, the VR controller 112 may initiate measuring the characteristic system energy. In some examples, a value of the POMS threshold voltage may be predefined for a given identity (e.g., a batch, a model number, a product family identity) corresponding the load 104. In some other examples, the POMS threshold voltage may be customizable by a user/administrator of the computing system 100 at a value lower than the operating voltage of the load 104. In certain examples, the POMS threshold voltage may be in a range of up-to 15% of an operating voltage of the load 104. By way of example, if the load 104 is a processor whose operating voltage is 1.5 V, the POMS threshold voltage may be in the range from 0 V to 0.15 V. In some other examples, the POMS threshold voltage may be set to 0 V.

At block 408, if it is determined that the output capacitor voltage is not greater than or equal to the POMS threshold voltage, the VR controller 112 may continue monitoring the output capacitor voltage as indicated at block 406. However, at block 408, if it is determined that the output capacitor voltage is greater than or equal to the POMS threshold voltage, the VR controller 112, at block 410, may measure the charging current and the output capacitor voltage. The output capacitor voltage may be measured in a similar fashion as described in conjunction with block 406. In certain examples, measuring the output capacitor voltage may be optional at block 410, instead the VR controller 112 may use the output capacitor voltage measured at block 406, however, the output capacitor voltage measured at block 410 may reflect accurate instantaneous measurement of the output capacitor voltage. Further, the VR controller 112 may measure the charging current from a current feedback signal received from one or more of the phase converters that are supplying the charging currents to the output capacitor 114. For example, if the phase converter 110A is enabled to supply the charging current, the phase converter 110A may send the current feedback signal to the VR controller 112, wherein the current feedback signal may be indicative of a magnitude of the charging current supplied by the phase converter 110A.

Moreover, at block 412, the VR controller 112 may perform another check to determine whether the output capacitor voltage (e.g., measured at block 410) is less than a power-on measurement end (POME) threshold voltage. The POME threshold voltage may be a predetermined voltage which when achieved by the output capacitor 114, the VR controller 112 may discontinue measuring the characteristic system energy. In some examples, a value of the POME threshold voltage may be predefined for a given identity (e.g., a batch, a model number, a product family identity) corresponding the load 104. In some other examples, the POME threshold voltage may be customizable by a user/administrator of the computing system 100. In certain examples, the POME threshold voltage may be equal to or lower than the operating voltage of the load 104. By way of example, the POME threshold voltage may be in a range from 60% to 100% of the operating voltage of the load 104. By way of example, if the load 104 is a processor whose operating voltage is 1.5 V, the POME threshold voltage may be in the range from 0.75 V to 1.5 V. In some other examples, the POME threshold voltage may be set to the operating voltage of the load 104 (e.g., 1.5 V).

At block 412, if it is determined that the output capacitor voltage is less than the POME threshold voltage, the VR controller 112, at block 414, may determine an instantaneous characteristics power-on energy based on the measured charging current and the measured output capacitor voltage. In some examples, the VR controller 112 may determine the instantaneous characteristics power-on energy as a product of the measured charging current, the measured output capacitor voltage, and a time-duration for which the charging current is supplied to the output capacitor 114. Further, at block 416, the VR controller 112 may accumulate the instantaneous characteristics power-on energy and may continue to execute the block 410. As depicted in the flow diagram of FIG. 4, the VR controller 112 may accumulate the instantaneous characteristics power-on energy until the output capacitor voltage reaches the POME threshold voltage.

Further, at block 412, if it is determined that the output capacitor voltage is not less than the POME threshold voltage, the VR controller 112, at block 418, may store the accumulated instantaneous characteristics power-on energy as the characteristic system power-on energy corresponding to the given power-on event of the computing system 100. The VR controller 112 may store the accumulated instantaneous characteristics power-on energy as the characteristic system power-on energy in a machine-readable medium associated with the VR controller 112. For the given power-on event, the characteristic system power-on energy may represent the characteristic system energy.

Figure 5:
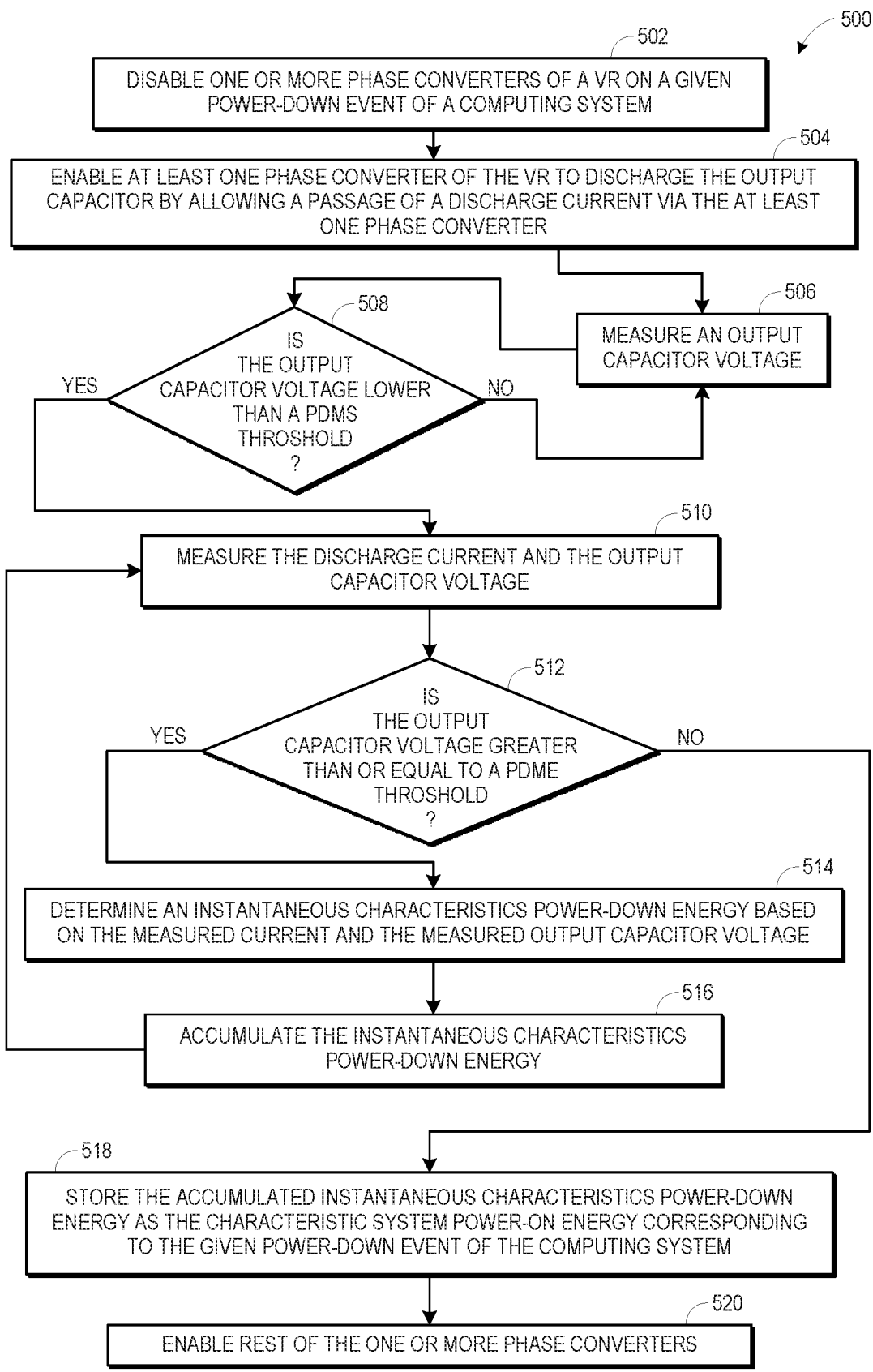
FIG. 5 is a flow diagram depicting a method for monitoring a characteristic system energy, in accordance with another example.

FIG. 5 is a flow diagram depicting a method 500 for monitoring a characteristic system energy, in accordance with an example. The method 500 may represent one example method of monitoring a characteristic system energy during a given power-down event of the computing system 100. In some examples, the method 500 may be performed by the VR controller 112 during each time the computing system 100 is powered-off. For illustration purposes, the method 500 will be described in conjunction with the computing system 100 of FIG. 1. The method 500 may include method blocks 502, 504, 506, 508, 510, 512, 514, 516, 518, and 520 (hereinafter collectively referred to as blocks 502-520) which may be performed by a processor-based system, for example, the VR controller 112. In particular, operations at each of the method blocks 502-520 may be performed by a processing resource (not shown in FIGS. 1 and 5, see FIG. 8) by executing instructions 306 stored in a machine-readable medium (see FIG. 8). In the example of FIG. 5, the VR controller 112 may measure the characteristic system energy as a characteristic system power-down energy for the given power-down event.

At block 502, the VR controller 112 may disable the one or more phase converters 110A-110C of the VR 106 at the given power-down event of the computing system 100 (e.g., when the computing system 100 is powered-off). In particular, in some examples, all of the phase converters 110A-110C may be disabled. The VR controller 112 may disable the phase converters 110A-110C by discontinuing sending control signals to the phase converters 110A-110C. Further, at block 504, the VR controller 112 may enable at least one phase converter of the one or more phase converters 110A-110C to discharge the output capacitor 114 by allowing a passage of a discharging current of the output capacitor 114 via the at least one phase converter. In some examples, the VR controller 112 may enable one of the phase converters 110A-110C (e.g., the phase converter 110A) to discharge to the output capacitor 114. In certain other examples, the VR controller 112 may enable a plurality of the phase converters 110A-110O (e.g., the phase converter 110A) or all of the phase converters 110A-110C to discharge the output capacitor 114. As will be appreciated, when the output capacitor 114 is discharged via only one phase converter (e.g., the phase converter 110A), a better signal-to-noise ratio may be achieved in measurement of the discharging current at blocks 506 and 510 (described later) in comparison to a measurement of discharging current supplied by the plurality of the phase converters 110A-110C. Further, in some example, the VR controller 112 may switch among phase converters of the one or more phase converters 110A-110O to discharge the output capacitor 114 for different power-down events, in a similar fashion as described in FIG. 4. Such switching among phase converters to discharge the output capacitor 114 may enhance the lifetime of the phase converters 110A-110C.

Further, at block 506, the VR controller 112 may measure the output capacitor voltage. Furthermore, at block 508, the VR controller 112 may compare the output capacitor voltage with a power-down measurement start (PDMS) threshold voltage to determine whether the output capacitor voltage is lower than the PDMS threshold voltage. The PDMS threshold voltage may be a predetermined voltage which when achieved by the output capacitor 114, the VR controller 112 may initiate measuring the characteristic system energy. In some examples, a value of the PDMS threshold voltage may be predefined for a given identity (e.g., a batch, a model number, a product family identity) corresponding the load 104. In some other examples, the PDMS threshold voltage may be customizable by a user/administrator of the computing system 100. In certain examples, the PDMS threshold voltage may be equal to or lower than the operating voltage of the load 104. By way of example, the PDMS threshold voltage may be in a range from 60% to 100% of the operating voltage of the load 104. By way of example, if the load 104 is a processor whose operating voltage is 1.5 V, the PDMS threshold voltage may be in the range from 0.75 V to 1.5 V. In some other examples, the PDMS threshold voltage may be set to the operating voltage of the load 104 (e.g., 1.5 V). In some examples, the PDMS threshold voltage may be similar to the POME threshold voltage.

At block 508, if it is determined that the output capacitor voltage is not lower than or equal to the PDMS threshold voltage, the VR controller 112 may continue monitoring the output capacitor voltage as indicated at block 506. However, at block 508, if it is determined that the output capacitor voltage is lower than the PDMS threshold voltage, the VR controller 112, at block 510, may measure the discharging current of the output capacitor 114 and the output capacitor voltage. The output capacitor voltage may be measured in a similar fashion as described in conjunction with block 506. In certain examples, measuring the output capacitor voltage may be optional at block 510, instead the VR controller 112 may use the output capacitor voltage measured at block 506, however, the output capacitor voltage measured at block 410 may reflect accurate instantaneous measurement of the output capacitor voltage. The VR controller 112 may measure the discharging current from a current feedback signal received from one or more of the phase converters that are enabled for discharging the output capacitor 114. For example, if the phase converter 110A is enabled to supply the charging current, the phase converter 110A may send the current feedback signal to the VR controller 112, wherein the current feedback signal may be indicative of a magnitude of the discharging current passing through the phase converter 110A.

Moreover, at block 512, the VR controller 112 may perform another check to determine whether the output capacitor voltage (e.g., measured at block 510) is greater than or equal to a power-down measurement end (PDME) threshold voltage. The PDME threshold voltage may be a predetermined voltage which when achieved by the output capacitor 114, the VR controller 112 may discontinue measuring the characteristic system energy. In some examples, a value of the PDME threshold voltage may be predefined for a given identity (e.g., a batch, a model number, a product family identity) corresponding the load 104. In some other examples, the PDME threshold voltage may be customizable by a user/administrator of the computing system 100. In certain examples, the PDME threshold voltage may be in a range of up-to 15% of an operating voltage of the load 104. By way of example, if the load 104 is a processor whose operating voltage is 1.5 V, the PDME threshold voltage may be in the range of 0 to 0.15 V. In some other examples, the PDME threshold voltage may be set to 0 V. In some examples, the PDME threshold voltage may be similar to the POMS threshold voltage.

At block 512, if it is determined that the output capacitor voltage is greater than or equal to the PDME threshold voltage, the VR controller 112, at block 514, may determine an instantaneous characteristics power-down energy based on the measured charging current and the measured output capacitor voltage. In some examples, the VR controller 112 may determine the instantaneous characteristics power-down energy as a product of the measured discharging current, the measured output capacitor voltage, and a time-duration for which the discharging current is supplied from the output capacitor 114. Further, at block 516, the VR controller 112 may accumulate the instantaneous characteristics power-down energy and may continue to execute the block 510. As depicted in the flow diagram of FIG. 5, the VR controller 112 may accumulate the instantaneous characteristics power-down energy until the output capacitor voltage reaches the PDME threshold voltage.

Further, at block 512, if it is determined that the output capacitor voltage is lower than the PDME threshold voltage, the VR controller 112, at block 518, may store the accumulated instantaneous characteristics power-down energy as the characteristic system power-down energy corresponding to the given power-down event of the computing system 100 a machine-readable medium associated with the VR controller 112. For the given power-down event, the characteristic system power-down energy may represent the characteristic system energy. Moreover, at block 520, the VR controller 112 may enable the rest of the one or more phase converters (i.e., phase converters of the phase converters 110A-1100 other than the one(s) enabled at block 504) to allow the flow of the discharging current.

Figure 6:
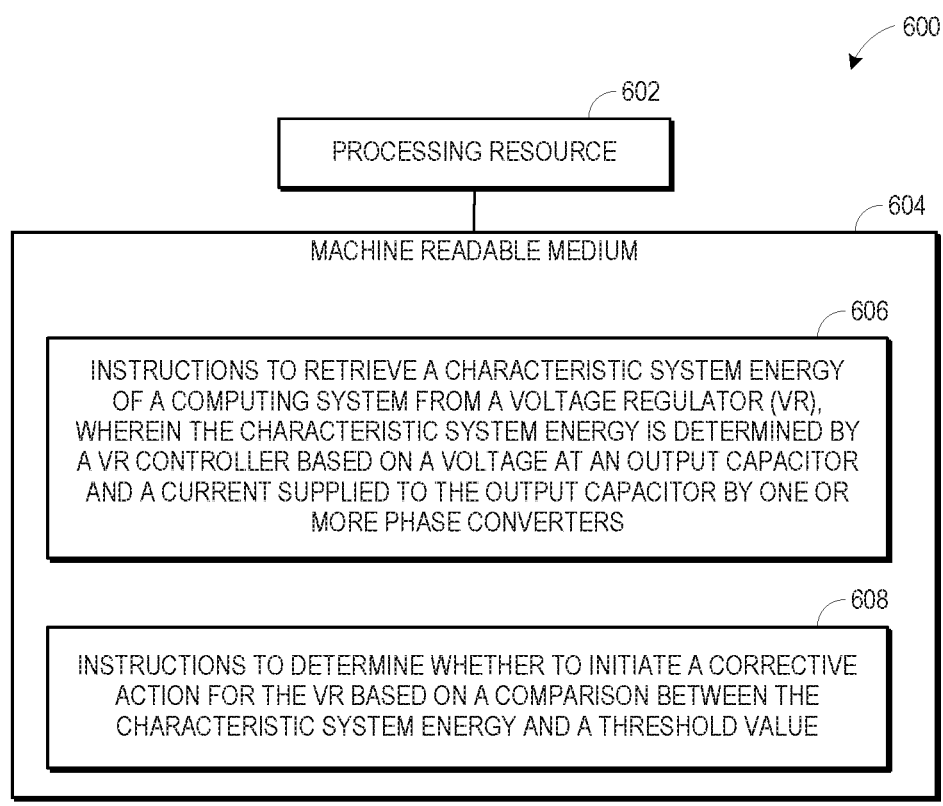
FIG. 6 is a block diagram depicting a processing resource and a machine-readable medium encoded with example instructions to determine whether to take a corrective action, in accordance with an example.

Moving to FIG. 6, a block diagram 600 depicting a processing resource 602 and a machine-readable medium 604 encoded with example instructions to determine whether to take a corrective action for the computing system 100. The machine-readable medium 604 may be non-transitory and is alternatively referred to as a non-transitory machine-readable medium 604. In some examples, the machine-readable medium 604 may be accessed by the processing resource 602. In some examples, the processing resource 602 may represent one example of the processing resource 116 of the system controller 108. Further, the machine-readable medium 604 may represent one example of the machine-readable medium 118 of the system controller 108.

The machine-readable medium 604 may be any electronic, magnetic, optical, or other physical storage device that may store data and/or executable instructions. Therefore, the machine-readable medium 604 may be, for example, RAM, an EEPROM, a storage drive, a flash memory, a CD-ROM, and the like. As described in detail herein, the machine-readable medium 604 may be encoded with executable instructions 606 and 608 for performing the method 200 described in FIG. 2. Although not shown, in some examples, the machine-readable medium 604 may be encoded with certain additional executable instructions to perform the method 300 of FIG. 3, the method 400 of FIG. 4, the method 500 of FIG. 5, and/or any other operations performed by the system controller 108, without limiting the scope of the present disclosure.

The processing resource 602 may be a physical device, for example, one or more CPU, one or more semiconductor-based microprocessor, one or more GPU, ASIC, FPGA, other hardware devices capable of retrieving and executing the instructions 606, 608 stored in the machine-readable medium 604, or combinations thereof. In some examples, the processing resource 602 may fetch, decode, and execute the instructions 606, 608 stored in the machine-readable medium 604 to determine whether to take corrective action for the computing system 100. In certain examples, as an alternative or in addition to retrieving and executing the instructions 606, 608, the processing resource 602 may include at least one IC, other control logic, other electronic circuits, or combinations thereof that include a number of electronic components for performing the functionalities intended to be performed by the system controller 108 of FIG. 1.

The instructions 606 when executed by the processing resource 602 may cause the processing resource 602 to retrieve a characteristic system energy of the computing system 100 from the VR 106. The characteristic system energy may be related to a sum of capacitances comprising a capacitance of the output capacitor and a capacitance of the load 104 and is determined by the VR controller 112 based on the output capacitor voltage and the charging current or the discharging current of the output capacitor 114 via the one or more phase converters 110A-1100. Further, the instructions 608 when executed by the processing resource 602 may cause the processing resource 602 to determine whether to initiate a corrective action (e.g., generating an alert, a service/maintenance request, changing an operating mode of the VR) for the VR 106 based on a comparison between the characteristic system energy and a threshold value.

Although not shown in FIG. 6, in some examples, the machine-readable medium 604 may also include additional instructions which when executed by the processing resource 602 to select the threshold value based on an identity of the load 104; determine whether the characteristic system energy is lower than the threshold value; and initiate the corrective action in response to determining that the characteristic system energy is lower than the threshold value. Further, in certain examples, the machine-readable medium 604 may also include additional instructions which when executed by the processing resource 602 to create a log of the characteristic system energy retrieved from the VR controller 112 the over a period and determine a trend of the characteristic system energy variation based on the log. Furthermore, in certain examples, the machine-readable medium 604 may also include additional instructions which when executed by the processing resource 602 to determine that there exists an issue with the load 104 if the trend shows an incline in the characteristic system energy over the period. Additionally, in some examples, the machine-readable medium 604 may also include additional instructions which when executed by the processing resource 602 to determine that the output capacitor 114 of the VR 106 has degraded if the trend shows a decline in the characteristic system energy over the period.

Figure 7:
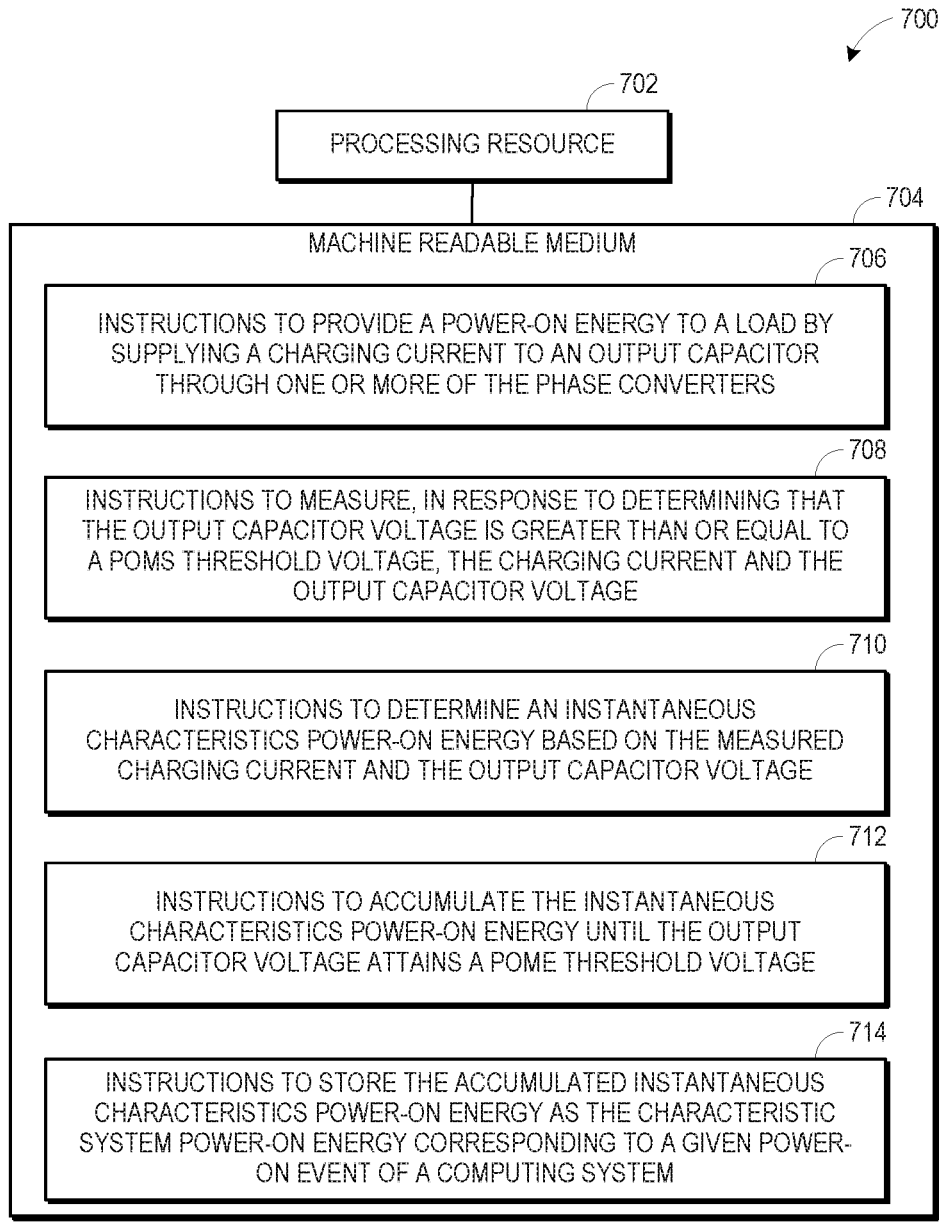
FIG. 7 is a block diagram depicting a processing resource and a machine-readable medium encoded with example instructions to monitor a characteristic system energy, in accordance with an example.

Referring now to FIG. 7, a block diagram 700 depicting a processing resource 702 and a machine-readable medium 704 encoded with example instructions to monitor a characteristic system energy, in accordance with an example. The block diagram 700 may represent the VR controller 112, in one example. The processing resource 702 and a machine-readable medium 704 of FIG. 7 are similar in many aspects (e.g., types and structural details) with the processing resource 602 and the machine-readable medium 604 of FIG. 6, details of which are not repeated herein. The machine-readable medium 704 may store instructions 706, 708, 710, 712, and 714 that may be accessed and executed by the processing resource 702.

The instructions 706 when executed by the processing resource 702 may cause the processing resource 702 to provide a power-on energy to the load 104 by supplying a charging current to the output capacitor 114 through the one or more of the phase converters 110A-110O. Further, the instructions 708 when executed by the processing resource 702 may cause the processing resource 702 to measure response to determining that the output capacitor voltage is greater than or equal to the POMS threshold voltage, the charging current and the output capacitor voltage. Furthermore, the instructions 710 when executed by the processing resource 702 may cause the processing resource 702 to determine an instantaneous characteristics power-on energy based on the measured charging current and the measured output capacitor voltage. Moreover, the instructions 712 when executed by the processing resource 702 may cause the processing resource 702 to accumulate the instantaneous characteristics power-on energy until the output capacitor voltage attains the POME threshold voltage. Additionally, the instructions 714 when executed by the processing resource 702 may cause the processing resource 702 to store the accumulated instantaneous characteristics power-on energy as the characteristic system power-on energy corresponding to the given power-on event of the computing system 100. The accumulated instantaneous characteristics power-on energy as the characteristic system power-on energy in the machine-readable medium 704.

Figure 8:
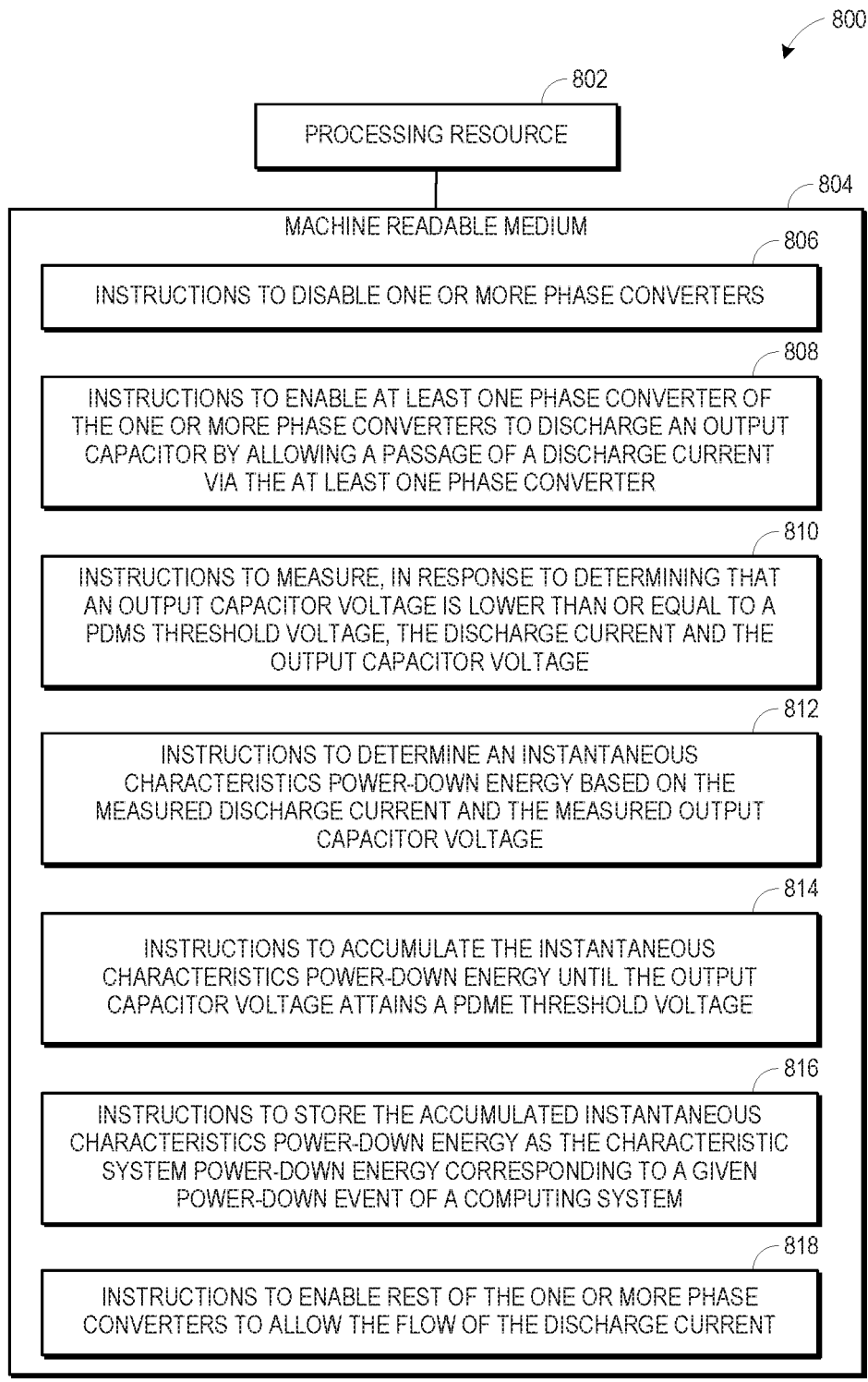
FIG. 8 is a block diagram depicting a processing resource and a machine-readable medium encoded with example instructions to monitor a characteristic system energy, in accordance with an example.

Referring now to FIG. 8, a block diagram 800 depicting a processing resource 802 and a machine-readable medium 804 encoded with example instructions to monitor a characteristic system energy, in accordance with an example. The block diagram 800 may represent the VR controller 112, in one example. The processing resource 802 and a machine-readable medium 804 of FIG. 8 are similar in many aspects (e.g., types and structural details) with the processing resource 602 and the machine-readable medium 604 of FIG. 6, details of which are not repeated herein. The machine-readable medium 804 may store instructions 806, 808, 810, 812, 814, 816, and 818 that may be accessed and executed by the processing resource 802.

The instructions 806 when executed by the processing resource 802 may cause the processing resource 802 to disable the one or more phase converters 110A-110O. Further, the instructions 808 when executed by the processing resource 802 may cause the processing resource 802 to enable at least one phase converter of the one or more phase converters 110A-110C to discharge the output capacitor 114 by allowing a passage of a discharging current via the at least one phase converter. The instructions 810 when executed by the processing resource 802 may cause the processing resource 802 to measure the discharging current and the output capacitor voltage, in response to determining that the output capacitor voltage is lower than or equal to the PDMS threshold voltage.

Furthermore, the instructions 812 when executed by the processing resource 802 may cause the processing resource 802 to determine an instantaneous characteristics power-down energy based on the measured discharging current and the measured output capacitor voltage. Moreover, the instructions 814 when executed by the processing resource 802 may cause the processing resource 802 to accumulate the instantaneous characteristics power-down energy until the output capacitor voltage attains the PDME threshold voltage. The instructions 816 when executed by the processing resource 802 may cause the processing resource 802 to store the accumulated instantaneous characteristics power-down energy as the characteristic system power-down energy corresponding to the given power-down event of the computing system 100. Additionally, the instructions 818 when executed by the processing resource 802 may cause the processing resource 802 to enable rest of the one or more phase converters 110A-110C to allow the flow of the discharging current.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and varia-

What is claimed is:

1. A system controller fora computing system, comprising:
    a machine-readable medium for storing executable instructions;
    a processing resource coupled to the machine-readable medium, wherein the processing resource executes the instructions to:
        retrieve a characteristic system energy of the computing system from a voltage regulator (VR) comprising a VR controller, one or more phase converters, and an output capacitor coupled to a load to provide an operating voltage to the load, wherein the characteristic system energy is related to a sum of capacitances comprising a capacitance of the output capacitor and a capacitance of the load and is determined by the VR controller based on a voltage at the output capacitor and a charging current or a discharging current of the output capacitor via the one or more phase converters; and
        determine whether to initiate a corrective action for the VR based on a comparison between the characteristic system energy and a threshold value.

2. The system controller of claim 1, wherein the computing system is a server, a storage system, a computer system, or an edge-computing device.

3. The system controller of claim 1, wherein the load comprises a compute resource.

4. The system controller of claim 1, wherein the processing resource executes the instructions to select the threshold value based on an identity of the load.

5. The system controller of claim 1, wherein the processing resource executes the instructions to:
    determine whether the characteristic system energy is lower than the threshold value; and
    initiate the corrective action in response to determining that the characteristic system energy is lower than the threshold value.

6. The system controller of claim 1, wherein processing resource executes the instructions to generate an alert, a service request, or both, as the corrective action.

7. The system controller of claim 1, wherein processing resource executes the instructions to operate the VR in a predefined safe mode, as the corrective action, to continue supply of power to the load from the VR.

8. The system controller of claim 1, wherein the processing resource executes the instructions to retrieve the characteristic system energy from the VR controller upon a given power transition event of the computing system.

9. The system controller of claim 8, wherein the given power transition event is a given power-on event of the computing system, wherein the characteristic system energy is a characteristic system power-on energy measured by the VR controller during the given power-on event of the computing system, and wherein the VR controller is to:
    provide a power-on energy to the load by supplying the charging current to the output capacitor through the one or more of the phase converters;
    measure the charging current and the voltage at the output capacitor;
    determine an instantaneous characteristics power-on energy based on the measured charging current and the measured voltage;
    accumulate the instantaneous characteristics power-on energy until the measured voltage attains a power-on measurement end (POME) threshold voltage; and
    store the accumulated instantaneous characteristics power-on energy as the characteristic system power-on energy corresponding to the given power-on event of the computing system.

10. The system controller of claim 9, wherein the VR controller is to switch among phase converters of the one or more phase converters to charge the output capacitor.

11. The system controller of claim 9, wherein the VR controller is to initiate the determination of the instantaneous characteristics power-on energy and the accumulation of the instantaneous characteristics power-on energy after the measured voltage attains a power-on measurement start (POMS) threshold voltage that is lower than the POME threshold voltage.

12. The system controller of claim 8, wherein the given power transition event is a given power-down event of the computing system, wherein the characteristic system energy is a characteristic system power-down energy measured by the VR controller during the given power-down event of the computing system, and wherein the VR controller is to:
    disable the one or more phase converters;
    enable at least one phase converter of the one or more phase converters to discharge the output capacitor by allowing a passage of the discharging current via the at least one phase converter;
    measure, in response to determining that the voltage of the output capacitor is lower than or equal to a power-down measurement start (PDMS) threshold voltage, the discharging current and the voltage at the output capacitor;
    determine an instantaneous characteristics power-down energy based on the measured discharging current and the measured voltage;
    accumulate the instantaneous characteristics power-down energy until the measured voltage attains a power-down measurement end (PDME) threshold voltage that is lower than the PDMS threshold voltage;
    store the accumulated instantaneous characteristics power-down energy as the characteristic system power-down energy corresponding to the given power-down event of the computing system; and
    enable rest of the one or more phase converters to allow the flow of the discharging current.

13. The system controller of claim 1, wherein the processing resource executes the instructions to:
    create a log of the characteristic system energy retrieved from the VR controller the over a period;
    determine a trend of the characteristic system energy variation based on the log;
    determine that there exists an issue with the load if the trend shows an incline in a value of the characteristic system energy over a period; and
    determine that the output capacitor of the VR has degraded if the trend shows a decline in the value of the characteristic system energy over the period.

14. A non-transitory machine-readable medium storing instructions executable by a processing resource, the instructions comprising:
    instructions to retrieve a characteristic system energy of the computing system from a voltage regulator (VR) comprising a VR controller, one or more phase converters, and an output capacitor coupled to a load to provide an operating voltage to the load, wherein the characteristic system energy is determined by the VR controller based on a voltage at the output capacitor and a charging current or a discharging current of the output capacitor via the one or more phase converters; and instructions to determine whether to initiate a corrective action for the VR based on a comparison between the characteristic system energy and a threshold value.

15. The non-transitory machine-readable medium of claim 14, further comprising:
   instructions to determine whether the characteristic system energy is lower than the threshold value; and
   instructions to initiate the corrective action for the VR in response to determining that the characteristic system energy is lower than the threshold value.

16. The non-transitory machine-readable medium of claim 14, further comprising instructions to create a log of the characteristic system energy retrieved from the VR controller the over a period.

17. The non-transitory machine-readable medium of claim 16, further comprising:
   instructions to determine a trend of the characteristic system energy variation based on the log;
   instructions to determine that there exists an issue with the load if the trend shows an incline in the characteristic system energy over the period; and
   instructions to determine that the output capacitor of the VR has degraded if the trend shows a decline in the characteristic system energy over the period.

18. A method comprising:
   retrieving, by a system controller, a characteristic system energy of the computing system from a voltage regulator (VR) comprising a VR controller, one or more phase converters, and an output capacitor coupled to a load to provide an operating voltage to the load, wherein the characteristic system energy is related to a sum of capacitances comprising a capacitance of the output capacitor and a capacitance of the load and is determined by the VR controller based on a voltage at the output capacitor and a charging current or a discharging current of the output capacitor via the one or more phase converters;
   determining, by the system controller, whether to initiate a corrective action for the VR based on a comparison between the characteristic system energy and a threshold value.

19. The method of claim 18, wherein the characteristic system energy is a characteristic system power-on energy measured by the VR controller during a given power-on event of the computing system, and wherein the method further comprising:
   providing a power-on energy to the load by supplying the charging current to the output capacitor through the one or more of the phase converters;
   measuring, in response to determining that the voltage of the output capacitor is greater than or equal to a power-on measurement start (POMS) threshold voltage, the charging current and the voltage at the output capacitor;
   determining an instantaneous characteristics power-on energy based on the measured current and the measured voltage; and
   accumulating the instantaneous characteristics power-on energy until the measured voltage attains a power-on measurement end (POME) threshold voltage; and
   storing the accumulated instantaneous characteristics power-on energy as the characteristic system power-on energy corresponding to the given power-on event of the computing system.

20. The method of claim 18, wherein the characteristic system energy is a characteristic system power-down energy measured by the VR controller during a given power-down event of the computing system, and wherein the method further comprising:
   disabling the one or more phase converters;
   enabling at least one phase converter of the one or more phase converters to discharge the output capacitor by allowing a passage of the discharging current via the at least one phase converter;
   measuring, in response to determining that the voltage of the output capacitor is lower than or equal to a power-down measurement start (PDMS) threshold voltage, the discharging current and the voltage at the output capacitor;
   determining an instantaneous characteristics power-down energy based on the measured discharging current and the measured voltage;
   accumulating the instantaneous characteristics power-down energy until the measured voltage attains a power-down measurement end (PDME) threshold voltage that is lower than the PDMS threshold voltage;
   storing the accumulated instantaneous characteristics power-down energy as the characteristic system power-down energy corresponding to the given power-down event of the computing system; and
   enabling rest of the one or more phase converters to allow the flow of the discharging current.

* * * * *